US011930026B1

(12) United States Patent
McDaniel

(10) Patent No.: US 11,930,026 B1
(45) Date of Patent: Mar. 12, 2024

(54) AUTOMATING INTERACTIONS WITH WEB SERVICES

(71) Applicant: EJ2 Communications, Inc., New York, NY (US)

(72) Inventor: Austin McDaniel, West Palm Beach, FL (US)

(73) Assignee: EJ2 Communications, Inc., New York, NY (US)

(*) Notice: Subject to any disclaimer, the term of this patent is extended or adjusted under 35 U.S.C. 154(b) by 311 days.

(21) Appl. No.: 17/305,563

(22) Filed: Jul. 9, 2021

Related U.S. Application Data

(60) Provisional application No. 63/050,037, filed on Jul. 9, 2020.

(51) Int. Cl.
*H04L 9/40* (2022.01)
*G06F 9/48* (2006.01)

(52) U.S. Cl.
CPC ........ *H04L 63/1425* (2013.01); *G06F 9/4881* (2013.01)

(58) Field of Classification Search
CPC ... H04L 63/1425; H04L 65/61; G06F 9/4881; G06F 21/577; G06F 3/0484; G06Q 10/0633; G06Q 10/0635
See application file for complete search history.

(56) References Cited

U.S. PATENT DOCUMENTS 9,589,253 B2* 3/2017 Eby ...................... G06Q 10/103
11,017,301 B2* 5/2021 Ho .......................... G06N 5/04
2009/0307777 A1* 12/2009 He .......................... G06F 21/55
  726/25
2010/0042397 A1* 2/2010 Masugata ........... G06F 16/9024
  704/2
2020/0004604 A1* 1/2020 Lavoie .................. G06F 16/907
2020/0074301 A1* 3/2020 Shang .................... G06N 5/022
2020/0128047 A1* 4/2020 Biswas ............... H04L 63/1425
  (Continued)

OTHER PUBLICATIONS

Ali et al., "BATCH: Machine Learning Inference Serving on Serverless Platforms with Adaptive Batching," SC20: International Conference for High Performance Computing, Networking, Storage and Analysis Year: 2020 | Conference Paper | Publisher: IEEE.*
(Continued)

*Primary Examiner* — Roderick Tolentino
(74) *Attorney, Agent, or Firm* — Lowenstein Sandler LLP

(57) ABSTRACT

An integration manager identifies one or more services accessible by a computer system; determines a set of action components associated with the computer system, wherein each action component of the set of action components is configured to provide a functionality associated with at least one of the one or more services; receives, from a user of the computer system, a selection of a first action component from the set of action components; determines, based at least in part on the first action component, a second action component from the set of action components; links the first action component with the second action component, wherein an output of the first action component is linked to an input of the second action component; and generates an executable workflow, the executable workflow comprising the first action component linked with the second action component.

16 Claims, 14 Drawing Sheets

(56) References Cited

U.S. PATENT DOCUMENTS

2020/0201525 A1\*  6/2020  Chin ................... G06F 3/04847
2020/0294642 A1\*  9/2020  Bostic .................... G16H 50/20
2021/0406079 A1\* 12/2021  Atur ...................... G06F 9/4881

OTHER PUBLICATIONS

Yong-Yi et al., "An automated workflow composition to semantic web services," 2011 International Conference on Machine Learning and Cybernetics Year: 2011 | Conference Paper | Publisher: IEEE.\*

\* cited by examiner

Action Books

→ Action: List EC2 Instances

→ Action: Extract and Modify Data

Results jane@company.com
joe@company.com
jake@badcompany.com

FIG. 3F

AUTOMATING INTERACTIONS WITH WEB SERVICES

RELATED APPLICATIONS

This patent application claims the benefit under 35 U.S.C. § 119(e) of U.S. Provisional Application No. 63/050,037, filed Jul. 9, 2020, which is incorporated by reference herein.

TECHNICAL FIELD

The present disclosure is generally related to computer systems, and more particularly, to automating interactions with web services in computing systems.

BACKGROUND

Computer security, cybersecurity, or information technology security is the protection of computer systems and networks from information disclosure, theft of or damage to their hardware, software, or electronic data, as well as from the disruption or misdirection of the services they provide. Systems devoted to these protections can often involve interacting with various web services and data sources to identify potential threats.

BRIEF DESCRIPTION OF THE DRAWINGS

The present disclosure is illustrated by way of example, and not by way of limitation, and can be more fully understood with reference to the following detailed description when considered in connection with the figures in which:

FIGS. 3A-3J illustrate an example of a user interface that is invoked by a integration manager to construct a workflow, in accordance with one or more aspects of the present disclosure.

DETAILED DESCRIPTION

Described herein are methods and systems for automating interactions with web services for a computing environment. Cybersecurity systems can provide protection of computer systems and networks against security threats. Systems devoted to these protections can often involve interacting with various web services and data sources to identify potential threats. Conventional cybersecurity systems, however, either implement fully manual methods or fully automated methods of thread assessment. From a security perspective, the presents challenges with respect to speed and accuracy. Fully manual methods offer increased accuracy with very low speed. Conversely, fully automated method offer increased speed, but are very inaccurate. Additionally, convention systems do not typically involve interactively building automations where queries for information from external web services chain on one another. Performing conventional cybersecurity threat analysis is often a manual and tedious process that can involve cutting and pasting information from one web service into another to complete an investigation of a potential threat.

Aspects of the present disclosure address the above noted and other deficiencies by implementing an integration manager (e.g., as a computer program or a computer program component) to automate interactions with web services for a computing environment. The integration manager can facilitate interactively building a workflow of actions (or action components) that access various connected web services. The integration manager can receive a selection of a first action from a user along with a dataset upon which the action is to be performed. The integration manager can then determine a second action to be performed on the output of the first action (either via user selection or automatically selected based on observed system behavior). The integration manager can then link the actions and generate a workflow that includes the chained actions.

Aspects of the present disclosure present advantages over conventional solutions to the issues noted above. First, the integration manager of the present disclosure can provide analysts the ability to interactively construct investigation workflows without involving significant software development resources each time a new investigation is initiated. Thus, the integration manager can provides the accuracy of a manual system. Additionally, by providing the ability to chain action components to each other to construct a workflow, the integration manager can achieve the speed improvements of a fully automated system. Moreover, by improving both accuracy and speed simultaneously, the integration manager can significantly improve the overall efficiency of a cybersecurity system since a more accurate analysis can be produced more quickly, which can significantly reduce costs in both processing time as well as shorten the time necessary to mitigate potential threats.

Figure 1:
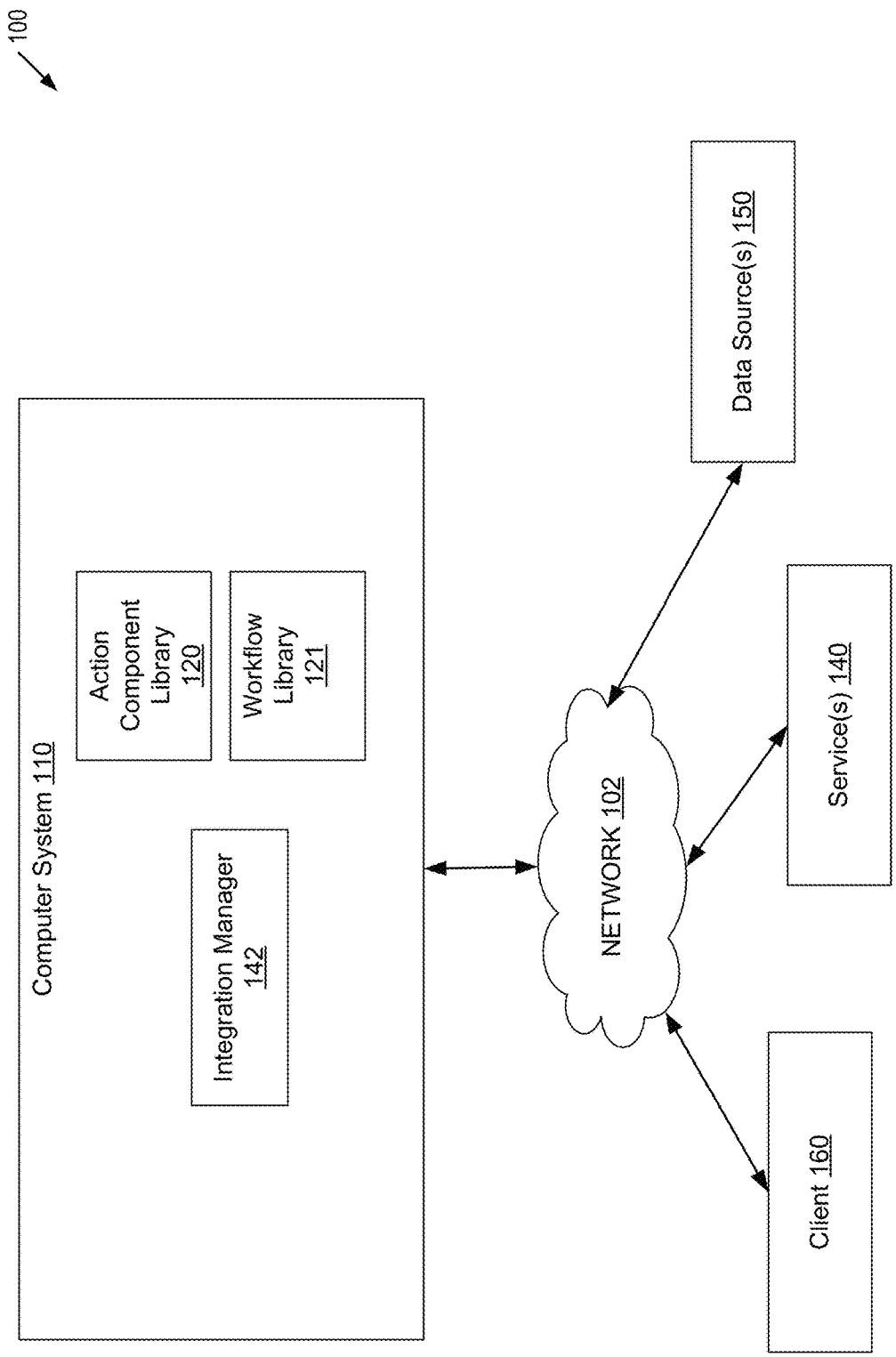
FIG. 1 depicts a high-level component diagram of an example computer system architecture, in accordance with one or more aspects of the present disclosure.

FIG. 1 is a block diagram of a network architecture 100 in which implementations of the disclosure may operate. In some implementations, the network architecture 100 may be used in a cloud computing services platform. A cloud computing services platform may include a Platform-as-a-Service (PaaS) system, that provides resources and services (e.g., micro-services) for the development and execution of applications owned or managed by multiple users. A PaaS system provides a platform and environment that allow users to build applications and services in a clustered compute environment (the "cloud"). In other implementations, the network architecture 100 may be used in a local network of physical machines (e.g., server computing systems). Although implementations of the disclosure are described in accordance with a certain type of system, this should not be considered as limiting the scope or usefulness of the features of the disclosure. For example, the features and techniques described herein can be used with other types of multi-tenant systems and/or computing services platforms.

As shown in FIG. 1, the network architecture 100 includes computer system 110. Computer system 110 may be a server computer system, a desktop computer or any other computing device. In some implementations, computer system 110 may be a cloud-based node in a cloud computing environment. The cloud computing environment may include one or more machines such as server computers, desktop computers, etc.

Computer system 110 may be connected to services 140, data sources 150, and/or clients 160 via a network 102, which may be a private network (e.g., a local area network (LAN), a wide area network (WAN), intranet, or other similar private networks) or a public network (e.g., the Internet). In various implementations, services 140 and/or data sources 150 can include technologies, data sources, and/or web or network enabled services and service providers to which the computer system 110 has access or connectivity. In various implementations, services 140 can include data storage services, cloud provider services (e.g., Amazon AWS EC2 ™, etc.), virtualization manager services, authentication services (e.g., Okta™, Microsoft Azure Active Directory™, etc.), security services, software tools, communication technologies, sentinels, or other similar technologies deployed on or connected to the computer system. Similarly data sources 150 can include databases or file systems on which datasets are stored that can be used as input to action components managed by the integration manager 142.

Each client 160 may be a mobile device, a PDA, a laptop, a desktop computer, a tablet computing device, a server device, or any other computing device that can access computer system 110 via network 102. In various implementations, client 160 can interact with computer system 110 using a user interface provided by integration manager 142 as discussed in further detail below. In some implementations, a developer, owner, or system administrator may access the computer system 110 from client 160. Additionally, or alternatively, the computer system 110 may be accessed using a web-based or cloud-based application that executes on a separate computing device that communicates with a client device via network 102.

The computer system 110 can include an integration manager 142 that facilitates automating interactions with web services (e.g., services 140, data sources 150). In various implementations, integration manager 142 can interface with a user to select a first action (or "action component")—such as integrated with a first product, web service, or security technology deployed on the computer network 100—from an action library 120. Each action component may be configured to provide a functionality associated with at least one of the services 140 or data sources 150.

In particular, an action component can be configured to integrate with (e.g., retrieve data from, process data from, output data to, execute behavior through) a particular extant service or tool (or a subset of services or tools). For example, action components can be configured to: read addresses from user accounts within a business communication platform accessed by users on the computer network; poll an event log of a first security technology deployed on the network; create new user accounts within a cloud-based software tool accessed by users on the computer network; query a network router for MAC addresses of machines sending and receiving traffic within the computer network; generate and publish tickets for security alerts to an alert feed hosted by a security technology deployed on the computer network; close security alerts and write closed alerts to security record; or the like.

The integration manager 142 can additionally select sample data from a larger dataset and automatically execute the first action on the sample data, returning results of this first action and sample data to the user for verification. Following confirmation from the user, the integration manager can interface with the user to select a second action (e.g., integrated with a different product, web service, or security technology deployed on the computer network) from the action component library 120 and link an output of the first action to an input of the second action. Subsequently the integration manager 142 can automatically execute the first action on the first output of the first action when executed on the sample data, and return results of this second action and sample data to the user for verification of configuration of the second action.

Integration manager 142 can repeat this process to execute and return results of additional actions selected by the user based on outputs of previously-verified actions and based on connections between action outputs and action inputs selected by the user to generate a single "workflow" or "flow" (e.g., from the sample data to a target final action or target final result) and store this resulting workflow as a new "action book" in a workflow library 121. Once validated, integration manager can automatically execute the complete workflow on the complete dataset.

Integration manager 142 can interface with the user to sequentially select an action, test the action on a sample data from a dataset or on an output of a preceding action traced to the sample data, interface with the user to validate the action, and append the action to a workflow once validated. For example, actions assembled into a workflow or "action book" may be integrated with different products, web services, and security technologies deployed on the network and therefore may ingest inputs and return outputs in disjointed formats. The computer system can thus enable the user to focus on constructing and validating a singular action that ingests a singular input value (or a singular set of input values for an action requiring multiple input values) from the dataset or preceding action and that returns a valid output value before adding further actions to a flow and without creating a large(r) set of output values (e.g., a "data dump") that may be too cumbersome for error diagnosis or otherwise inhibit efficient validation of individual actions and the flow as a whole.

In particular, by manipulating a single action and a single sample input value (or single sample set of input values) for the user, the integration manager can generate a sample output that is both authentic (i.e., representative of a real output generated by the action when the flow is executed on the selected dataset) and enables the user to quickly identify errors (e.g., due to misalignment of an object type output by a preceding action and an object type input required by the action) and correct the action accordingly. By then expanding this action to a slightly larger subset of the dataset (e.g., three sample input values or three sample sets of input values), the computer system can enable the user to view outputs of the action on a representative distribution of inputs, which may surface further errors and enable the user to further refine the action before adding a next action to the flow and before running the action or the entire flow on the whole dataset. Once these individual actions are validated, the computer system can compile these actions into a complete task automation with many steps and integrated with a variety of different products and tools deployed on the computer system.

Integration manager 142 is described in further detail below with respect to FIG. 2.

Figure 2:
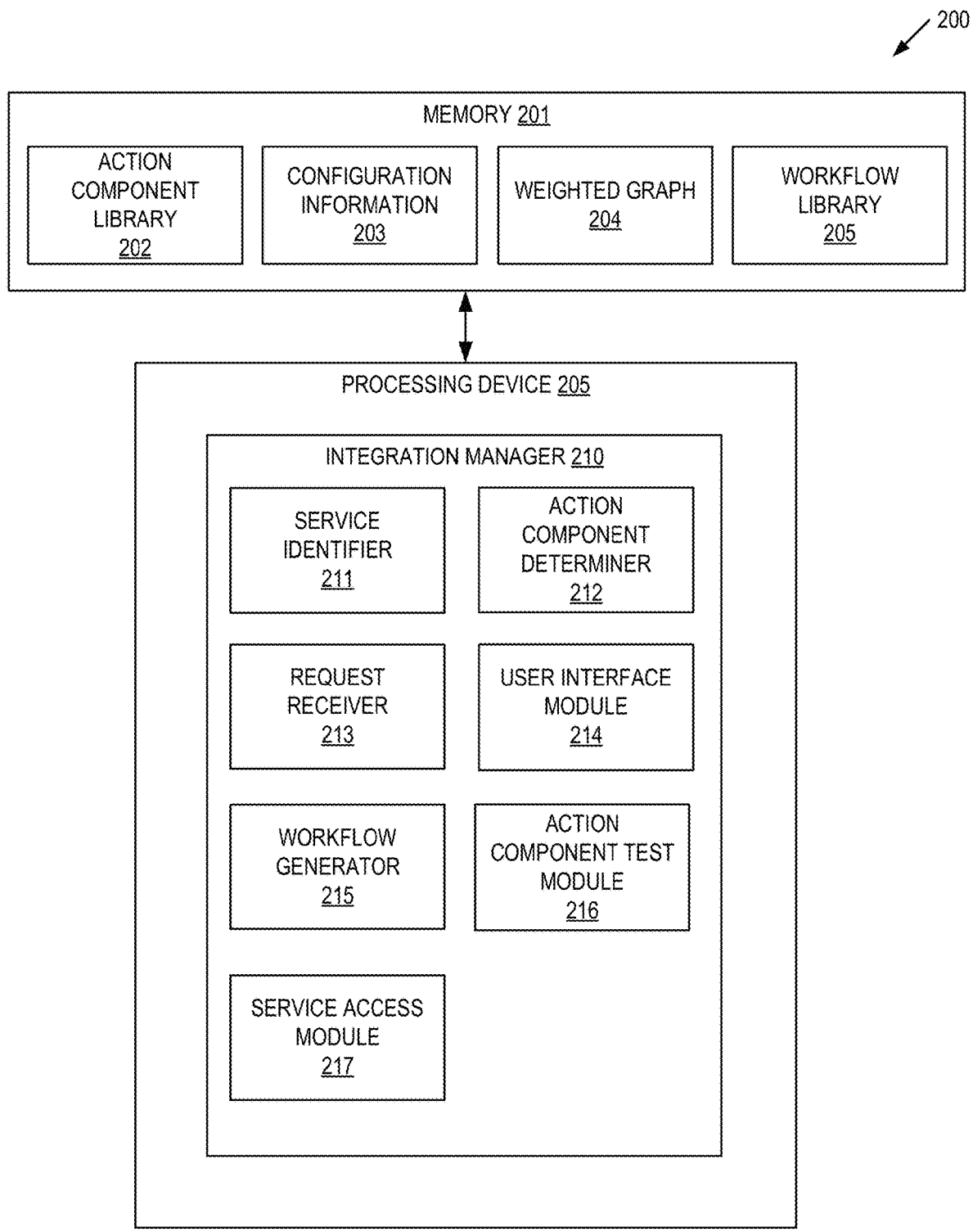
FIG. 2 depicts a block diagram illustrating an example of an integration manager, in accordance with one or more aspects of the present disclosure.

FIG. 2 depicts a block diagram illustrating an example of an integration manager 210 for facilitating automating interactions with web services for computing environment. In some implementations, integration manager 210 may correspond to integration manager 142 of FIG. 1. As shown in FIG. 2, integration manager 210 may be a component of a computing apparatus 200 that includes a processing device 205, operatively coupled to a memory 201, to execute integration manager 210. In some implementations, processing device 205 and memory 201 may correspond to processing device 502 and main memory 504 respectively as described below with respect to FIG. 5.

Integration manager 210 may include service identifier 211, action component determiner 212, request receiver 213, user interface module 214, workflow generator 215, action component test module 216, and service access module 217. Alternatively, the functionality of one or more of service identifier 211, action component determiner 212, request receiver 213, user interface module 214, workflow generator 215, action component test module 216, and service access module 217 may be combined into a single module or divided into multiple sub-modules.

Service identifier 211 is responsible for identifying services accessible by the computer system. Service identifier 211 can identify the technologies, data sources, and/or web or network enabled services and service providers to which the computer system executing the integration manager 210 has access or connectivity. In various implementations, services can include data storage services, cloud provider services (e.g., Amazon AWS EC2 ™, etc.), virtualization manager services, authentication services (e.g., Okta™, Microsoft Azure Active Directory™, etc.), security services, software tools, communication technologies, sentinels, or other similar technologies deployed on or connected to the computer system. Service identifier can identify the connected services by polling ports of the computer system network connections, analyzing the computer system processes, analyzing a stored list of installed services (e.g., maintained by a system administrator), or the like.

Action component determiner 212 is responsible for determining a set of action components associated with the computer system. In various implementations each action component is configured to provide a functionality associated with at least one of the services identified by service identifier 211. In particular, an action component can be configured to integrate with (e.g., retrieve data from, process data from, output data to, execute behavior through) a particular extant service or tool (or a subset of services or tools). For example, action components can be configured to: read addresses from user accounts within a business communication platform accessed by users on the computer network; poll an event log of a first security technology deployed on the network; create new user accounts within a cloud-based software tool accessed by users on the computer network; query a network router for MAC addresses of machines sending and receiving traffic within the computer network; generate and publish tickets for security alerts to an alert feed hosted by a security technology deployed on the computer network; close security alerts and write closed alerts to security record; or the like.

In various implementations, the computer system can host an "action library" (e.g., action components library 202) that includes a suite of discrete preloaded actions configured to integrate with the various extant web services, security technologies, software tools, communication technologies, sentinels, etc. deployed on or connected to the computer network. Action component determiner 212 can access the action components library 202 to identify the action components available to the computer system for use in constructing executable workflows.

In some implementations, action component determiner 212 can additionally access information associated with a user (e.g., from configuration information 203) to determine which of the action components that user is authorized to access. For example, the configuration information 203 can include authorization credentials (e.g., user ID, password, subscription identifier, etc.) associated with the services to which a user has access. Action component determiner 212 can access this information in conjunction with the action components library 202 to further identify which of the stored action components can be used by a particular user. In one implementation, an administrator or other affiliate of the computer network can supply login information or other credentials for products and tools installed or enabled across the computer network or at particular assets within the network. Action component determiner 212 (or other component integration manager 210) can then load plugins for these products and tools and automatically enter login information or other credentials supplied by the administrator in order to gain access to event logs, alert feeds, user accounts, controls, etc. of these products and tools.

Each action within the action library is configured to integrate with one or a small subset of products and tools, so action component determiner 212 can mute or otherwise disable actions contained in the action component library that are configured to integrate with products and tools not enabled (e.g., by supplying login credentials) within the system. Integration manager 210 can also enable muted action components over time responsive to integration of additional products and tools by the administrator, responsive to new access acquired by a particular user, responsive to a recommendation to add a new service for a suggested workflow, or the like. In various implementations, action component determiner 212 can invoke service access module 217 to enable/disable access for a particular user as described in further detail below.

Request receiver 213 is responsible for receiving, from a user of the computer system, a selection of a first action component from the set of action components. As noted above, the first action component can provide a particular functionality for a particular service accessible by the computer system. In some implementations, the request can be received from the user via a user portal: to receive selection of an option to create a new executable workflow (or "action book") from the user; to present enabled actions—in the action library—to the user; and to receive selection of the first action for the new action book from this set of enabled actions. In such implementations, user interface module 214 can be invoked by integration manager 210 to present the user portal to the user and interact with various other components of the integration manager 210 to complete the above actions described herein. For example, user interface module 214 can host an action search bar within the user portal, invoke action component determiner 212 to identify action components available to the user, and subsequently return a list of actions that meet search terms entered by the user, such as: product or tool search terms; input data (or "object") type search terms; output data type search terms; etc. In some implementations, once the action component has been selected by the user, the user interface module 214 can load and open an instance of the that action component within the user portal and then prompt the user to select an input database to be used as input to the selected action component.

In some implementations, a suite of preconfigured workflows can be stored in action component library 202 or in a separate workflow library (e.g., workflow library 205). In such instances, action component determiner 212 can enable a user to select a preloaded workflow as the first action component in the new workflow. A preloaded workflow can define a previously-validated sequence of actions integrated with a single product or tool or with multiple different products or tools. A preloaded workflow may have been created previously by the user or otherwise created within the computer network or extant outside of the computer network. The action component determiner 212 can filter the action library 202 (or workflow library 205) to include only preloaded flows that exclude actions integrated with a product or tool not enabled in the integration manager 210. In such implementations, once selected by the user, action component determiner 212 can load and open an instance of the first preloaded workflow within the user portal and then prompt the user to select an input database to use as input to the first component of the preloaded workflow.

In some implementations, once a first action component has been selected, the user can select an input dataset for the first action component. In such instances, the user interface module 214 and request receiver 213 can prompt the user to select an existing data set to insert into the first action during execution of the workflow. As described in further detail below, the user may additionally be prompted to select a portion of the data set (e.g., a sample data from the selected data set) to be used to test the selected first action.

In some implementations, the integration manager 210 enables the user to navigate to a database or enter an address of a database containing a dataset. In other implementations, the integration manager 210 accesses a dataset uploaded by the user and displays contents of the dataset. For example, the user can upload or navigate to: a log of network events; an alert feed published by a security technology deployed on the network; a message log within an internal communication platform; or a user database containing user accounts within a product deployed on the computer network. In such instances, integration manager 210 can then prompt the user to select: a sample network event from the log; a sample alert from the alert feed; a sample message from the message log; or a user account within the user database.

In some implementations, integration manager 210 provides the user with the option of selecting an input data set before selecting a workflow or constructing a new workflow by selecting a new first action component. In such instances, the upon receiving the input data set selected by the user, request receiver 213 can invoke action component determiner 212 to identify a data (or "object") type of the data set and identify a subset of action components (from action component library 202) that accept that data type. Subsequently, action component determiner 212 can provide the subset of action components to the user interface module 212, which can in turn display the subset to the user and prompt the user to select the first action component from this subset.

In some implementations, integration manager 210 can prompt the user to select an initial action configured to retrieve a dataset or poll new data from a particular product or tool deployed on the network, and to select a log, address, database, or other output of the particular product or tool for the first action to retrieve at the start of the workflow. Integration manager 210 can then: execute the initial action component; aggregate data results output by the initial action component into a new container; present contents of this container to the user; and prompt the user to select a sample data from this container. In such implementations, integration manager 210 can also prompt the user to select a first action component—succeeding the initial action in the workflow—that ingests contents of the container and executes an operation accordingly. Integration manager 210 can then implement methods and techniques described below to: insert the initial action component and the first action component into the workflow; define the output of the particular product or tool as the input of the initial action component; and link the output of the initial action component to the input of the first action component.

In implementations in which the user elects an initial data retrieval action component, integration manager 210 can execute the initial action component on the entire input dataset, which returns a set of (i.e., one or more) outputs (e.g., of different data types) per data element in the input dataset. Integration manager 210 can then scan these sets of outputs for representative data types, common data types, anomalous data types, and/or a range of data types, such as: email addresses (common) and "ERROR" (anomaly); or unique user names (common) and "null" (anomaly). For example, the initial action component can generate one output vector containing a sequence of values per input datum from the input dataset. Accordingly, integration manager 210 can select a first value in each vector and implement clustering techniques to group these first values into clusters. If integration manager 210 identifies more than one cluster, it can select one representative value from each cluster, present these values to the user, prompt the user to confirm or reconfigure the initial action accordingly, and repeat this process for each other value in these output vectors. Once the user confirms the initial action, integration manager 210 can prompt the user to select a sample data from the first output dataset generated by the initial action component.

In some implementations, once the user has selected a first action component for the new workflow, action component determiner 212 can be invoked to recommend a second action component based at least in part on the user's selection for the first action component. In such instances, the action component library 202 can include (or have access to) an n-dimensional weighted graph (e.g., weighted graph 204) that links each action component to other action components in the action component library 202. In some implementations, the weighted graph 204 can include information that indicates which action components are configured to ingest a data type output by an associated action component, as well as the output a data type that the action component is configured to ingest.

Additionally or alternatively, the weighted graph 204 can include information indicating relationships between action components (e.g., action component sequences) based on previously configured workflows created by the same user or other users in the system. For example, the weighed graph can be used to identify a second action component for a user based on workflows of other users that started with the same first action component. As new dependencies are created in new workflows, the weighted graph 204 can be updated to improve the suggestions generated for new workflows. In some implementations, the action component determiner 202 can access the weighted graph 204 and determine one or more additional action components that were selected most often in workflows with a similar first action component. For example, if the user selects action component 'A' as a first action, and the weighted graph indicates that a threshold percentage of other workflows that started with action 'A' selected either action component 'B' or action component 'C', action component determiner 202 can select action components 'B' and 'C' as potential candidates for a second action component in the workflow.

The action component determiner 212 can subsequently establish a link between the first action component and the second action component, where the output of the first action component is linked to the input of the second action component. In various implementations, the link can be established using an application programming interface (API) connection, establishing a pointer that associates output interface of the first action component to the input interface of the second action component, or the like.

In some implementations, the action component determiner 212 can automate the generation of a workflow given an input data set and a final action component to be executed in the workflow. In such instances, action component determiner 212 can invoke the user interface module 214 to prompt the user to select an input dataset, a sample data element from this input dataset, and a final action component from the action component library 204. Action component determiner can subsequently scan the action component library 204 for a possible sequence of actions and output-input connections that transition from a data type of the input dataset to the final action component. Action component determiner 212 can subsequently invoke workflow generator 215 to generate a test workflow based on this possible sequence of actions and output-input connections and execute the test flow on the sample data, returning the result of each action in the test flow to the user for verification.

In such implementations, action component determiner 212 can use the weighted graph 204 to determine the possible sequence of action components and output-input connections between the starting input data set and the final action component. Similarly, if the user has selected a starting action component and a final action component, action component determiner 212 can use the weighted graph to determine the possible sequence of action components and output-input connections between the two.

In such implementations, when the user selects the input dataset, action component determiner 212 can identify, using weighted graph 204, a subset of possible first action components that are configured to ingest the data type of the input dataset. In response to the user selecting the final action component from the action library 204, action component determiner 212 can identify the final action in the action library, muting (or removing from consideration) action components integrated with services and tools that not enabled at the integration manager (or for which the user does not have authorized access). Action component determiner 212 can determine, using the weighted graph, a shortest path from the final action component to a first action component within the subset of possible first actions. Action component determiner 212 can subsequently generate a test workflow including an ordered sequence of action components—from the first action component to the target final action component along this shortest path.

Action component determiner 212 can subsequently select a sample data from the input dataset (or invokes user interface module 214 to prompt the user to select the sample data from the input dataset), and invokes action component test module 216 to execute the first action in the test workflow on the sample data, returning the first output of the first action component to the user for validation. If this first output is successful, action component test module 216 can execute the second action component in the test flow on the first output of the first action component and interfaces with the user to validate the second action component. If, however, this first output of the first action component is unsuccessful, action component test module 216 can invoke user interface module 214 to prompt the user to reconfigure the first action component, generate an exception, or regenerate a new test workflow. If the user elects to regenerate a new test workflow, action component determiner 212 can scan the weighted graph 204 for an alternate shortest path from the final action component to an alternate first action component within the subset of possible first action components. Action component determiner 212 can then regenerate a new test workflow containing an ordered sequence of action components, from the alternate first action component to the target final action component along this alternate shortest path, and repeat the above process to validate the alternate first action.

Similarly, if the user selects a set of desired action components from the action component library 202, but the inputs and outputs of these action components do not match (are in incompatible formats, are not configured with similar data types, etc.), action component determiner 212 can identify these desired actions within the weighted graph 204 and compute a shortest path from an alternative action component (within or outside of the set of desired actions) configured to ingest a data type of the input dataset to the final target action, and intersecting each action components within the set of desired action components entered by the user. Action component determiner 212 can then generate a test workflow based on action components and connections along this path and implements methods and techniques described herein to sequentially test these actions based on the sample data from the input dataset. In such implementations, once the user validates the test workflow, workflow generator 215 can be invoked to generate and store the test workflow as a new executable workflow (e.g., a new action book), update the weighted graph 204, and selectively execute the new workflow on the entire input dataset.

In various implementations, output-input connections between action components represented in the weighted graph 204 can be annotated with error rates. For example, errors within a workflow may occur due to programming language differences of two action components—integrated with two different products or tools—connected within the workflow. For example, a first action component may output a "null" value and a second may read a "0" value. In another example, a first action component may output a floating-point value, a second action component may read 8-bit integer values, and a third action component may read 32-bit integer values.

In such instances, an output-input connection between two action components represented in the weighted graph 204 can be annotated with an error rate that represents probability or frequency of misalignment between a data type output by one action component and an input data type accepted by a second action component. For example, 0.000 for very low frequency of output-input misalignment, 0.900 for very high frequency of output-input misalignment, and 1.000 if a data type output by a first action component is not accepted as in input by a second action component.

In these implementations, rather than identify a shortest path between a viable first action component and a target final action component selected by the user, the action component determiner 212 can select a path, from a viable first action to the target final action, characterized by a lowest aggregate error rate between connected action components. to sequentially execute action components within this test flow can then be sequentially executed based on the sample data and a new workflow generated based on this test workflow once validated by the user.

In some implementations, once the user selects the input dataset and the final action component, integration manager 410 can calculate a shortest path and/or a lowest-error path from a viable first action component that ingests the data type of the input dataset to the final action component type within weighted graph 204. This can include action components integrated with products and tools enabled for use by the user as well as products and tools not enabled for use by the user. In response to identifying a shortest path and/or a lowest-error path that includes an action component integrated with a particular product tool not yet enabled for use by the user, action component determiner 212 can prompt the user to enable this particular action or tool if currently deployed on the computer network. If the user submits login or other credentials for this particular product or tool, action component determiner 212 can execute the foregoing methods and techniques to generate and validate a test workflow based on this shortest path and/or a lowest-error path.

If the user elects not to enter credentials for this particular product or tool, action component determiner 212 can calculate an alternate shortest path and/or alternate lowest-error path from a viable first action component to the final action component type within weighted graph 204, excluding action components integrated with the particular product or tool. The computer system can then execute the foregoing methods and techniques to validate a test flow based on this alternate path.

In some implementations, in response to identifying a shortest path and/or a lowest-error path that includes an action component integrated with a particular product tool or service not enabled for use by the user, action component determiner 212 can invoke service access module 217 to attempt to obtain access to the action component on the user's behalf. For example, if the weighted graph 204 indicates that the percentage of similar workflows in workflow library 205 that use that particular product tool satisfies a threshold (e.g., a particular percentage of similar workflows use this tool or service), service access module 217 can determine whether a free trial period is available, and if so, establish a trial account for that product tool or service. In various implementations, service access module 217 access configuration information 203 to determine whether the user has authorized service access module 217 to perform this operation on the user's behalf.

As noted above, in some implementations, the user may select and test action components sequentially in a test workflow for validation. Action component test module 216 is responsible for performing these operations. As noted above, once a first action component has been selected by the user, the user interface module 214 can load and open an instance of that action component within the user portal and then prompt the user to select an input database to be used as input to the selected action component, and select a sample data element from the selected input.

Action component test module 216 can subsequently execute, during a first test instance, the first action component on the selected sample data element. In some implementations, action component test module 216 can then provide the results (e.g., a set of output values of one or more data types) to the user interface for verification by the user. In such instances, the user can either confirm the configuration of the first action component, reconfigure the first action, or replace the first action component with an alternative first action component. For example, if the user notes that the output of the first action component (e.g., executed on the sample data from the input dataset) fails (e.g., includes an "ERROR" or "null" value), the user may elect an alternate dataset, elect an alternate first action component for the new workflow, or reconfigure parameters of the first action component.

Additionally or alternatively, action component test module 216 can interface with the user to select a second set of (e.g., one, three) sample data elements from the input dataset, execute the first action component on the second set of sample data elements, and return this first alternate set of outputs to the user for validation. If the user notes that the first alternate set of outputs are successful, the user may create an exception for a characteristic of the first sample data. Otherwise, the user may elect an alternate dataset, elect an alternate first action component for the new flow, or reconfigure parameters of the first action component. Action component test module 216 can then re-execute the reconfigured first action component or alternate first action component on these sample data elements and prompt the user to verify these sample outputs of the first action component.

If the user indicates that the output of the first action component—executed on the sample data from the input dataset—is successful (e.g., outputs a valid result), action component test module 216 can prompt the user to manually select a second set of (e.g., one, three) sample data elements from the input dataset; or automatically (e.g., randomly, pseudo-randomly, etc.) select the second set of sample data elements from the input dataset. Action component test module 216 can then execute the first action component on this second set of sample data elements, return this first extended set of outputs to the user for validation, and prompt the user to validate these additional results.

In response to verification of results of the first test instance, action component test module 216 can enable selection of a second action from the subset of actions, receive a selection of a first output of the first action from the first test instance, and link the output of the first action component to the input of the second action component (e.g., writing a pointer to the second action linking a second input of the second action to the first output of the first action). During a second test instance, action component test module 216 can execute the second action component on results of the first test instance, and prompt the user for verification of results of the second test instance. Responsive to receiving verification of the results of the second test instance, action component test module 216 can execute the workflow on the input dataset.

As described above, in some implementations action component test module 216 can prompt the user to provide validation of the test instances. Alternatively, action component test module 216 can invoke a trained model or other similar component to analyze the results of the test instances to provide validation. In such implementations, action component test module 216 can use the trained model or other similar component to determine a confidence level for the test instances that indicate whether or not the results can be accepted as valid.

FIGS. 3A-3J illustrate an example of a user interface 300 that is invoked by a integration manager (e.g., integration manager 142 in FIG. 1, or integration manager 210 in FIG. 2). As shown in FIGS. 3A-3J, the integration manager executes operations as described above with respect to FIG. 2 to provide a user with the ability to sequentially select and test action components and subsequently linking the components to generate a workflow. As shown, a user can select a series of action components to identify cloud computing resources that may have been created by unauthorized users of a computer system. It should be noted that while a particular sequence of action components are depicted to generate a particular workflow, aspects of the present disclosure can be implemented to construct sequences of action components other than those depicted in FIGS. 3A-3J.

Figure 3A:
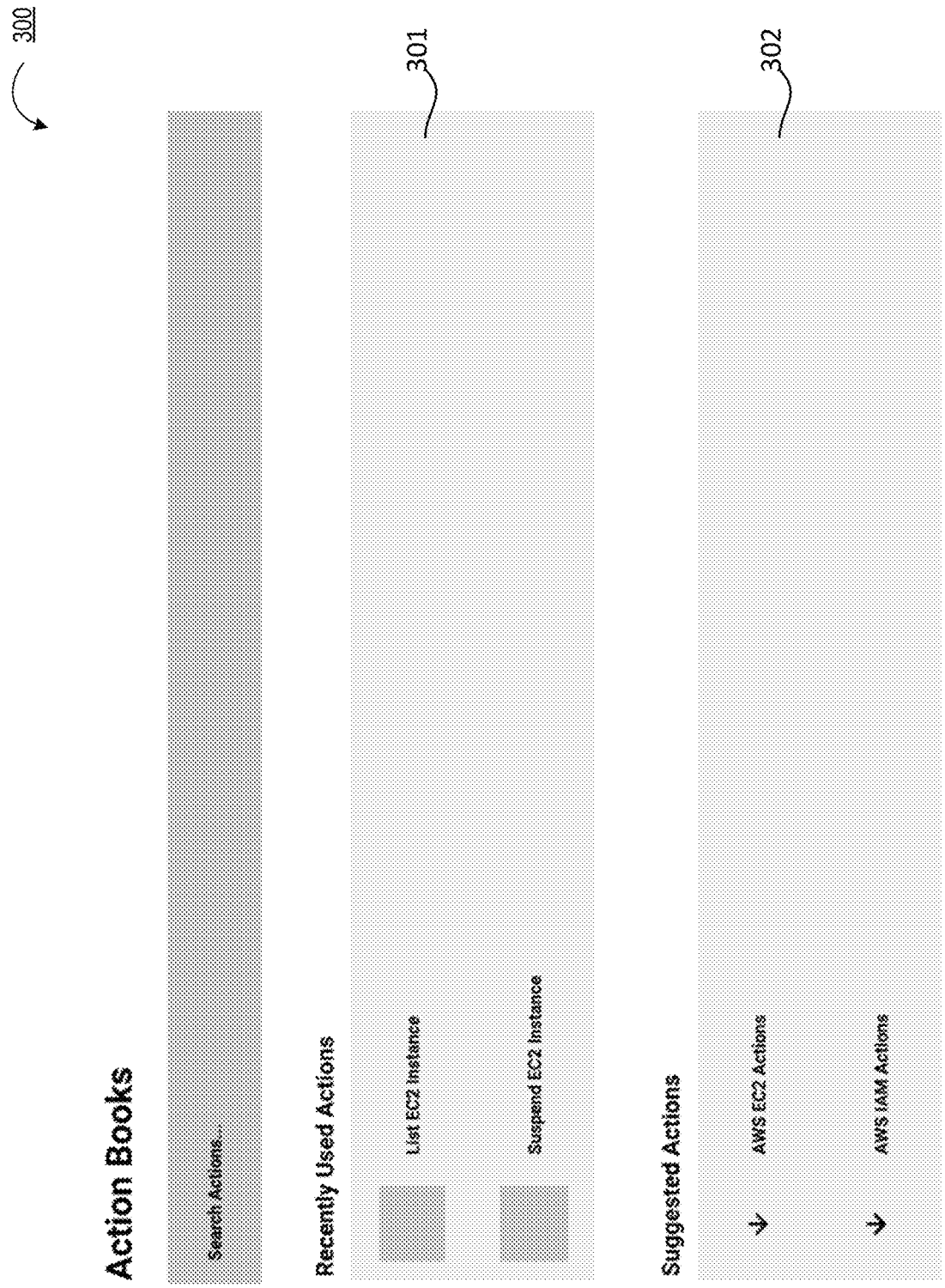

As shown in FIG. 3A, the integration manager can display the user interface 300 to a user to select a first action component to be used for a new executable workflow. As shown, the user interface 300 can display recently used actions 301 to the user that includes those action components recently used in other workflows by that user. Additionally, the user interface 300 can display a list of suggested actions 302 to the user based on that user's activity or the recent activity of other users of the computer system.

Figure 3B:
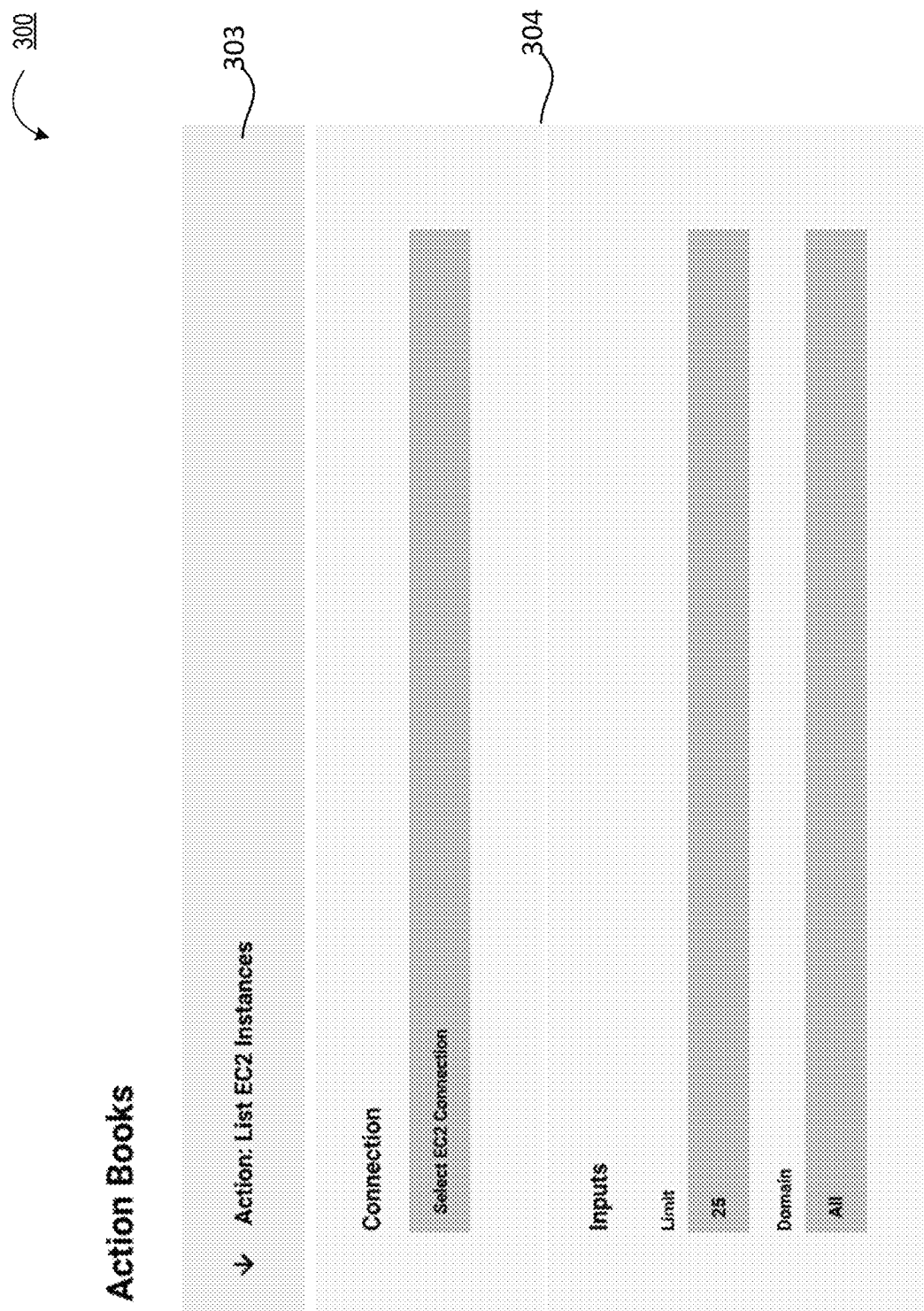

As shown in FIG. 3B, the user has selected action component 303 that lists the EC2 instances that are executing on the computing system associated with the user. As described above, once the user has selected a first action component, the user interface 300 can display additional information 304 to the user to allow the user to configure the inputs and outputs of the first action component.

Figure 3C:
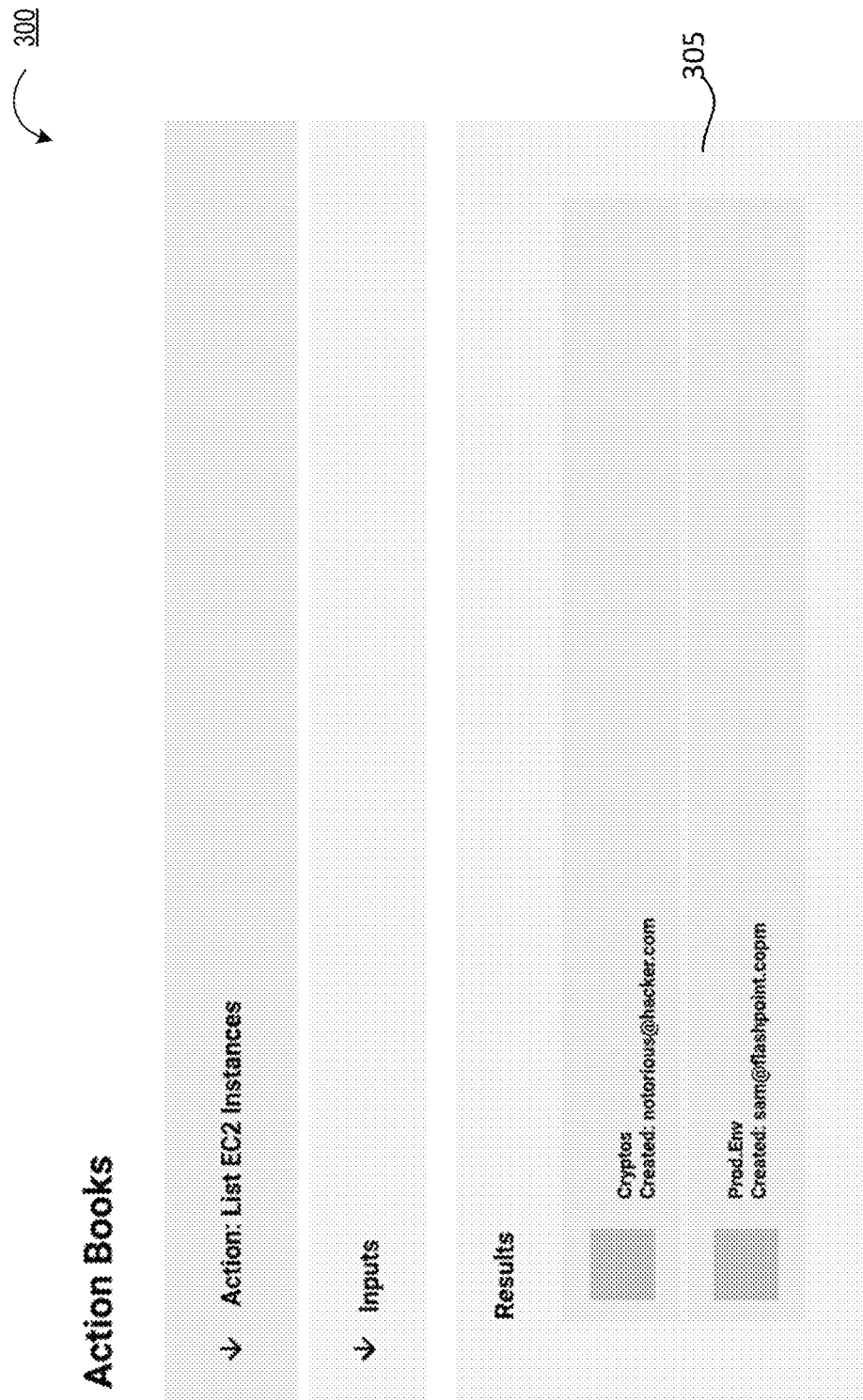

As shown in FIG. 3C, displays the execution of the first action component against the list of EC2 instances. In particular, results 305 displays the email addresses associated with the creator/owner of EC2 instances for the computer system.

Figure 3D:
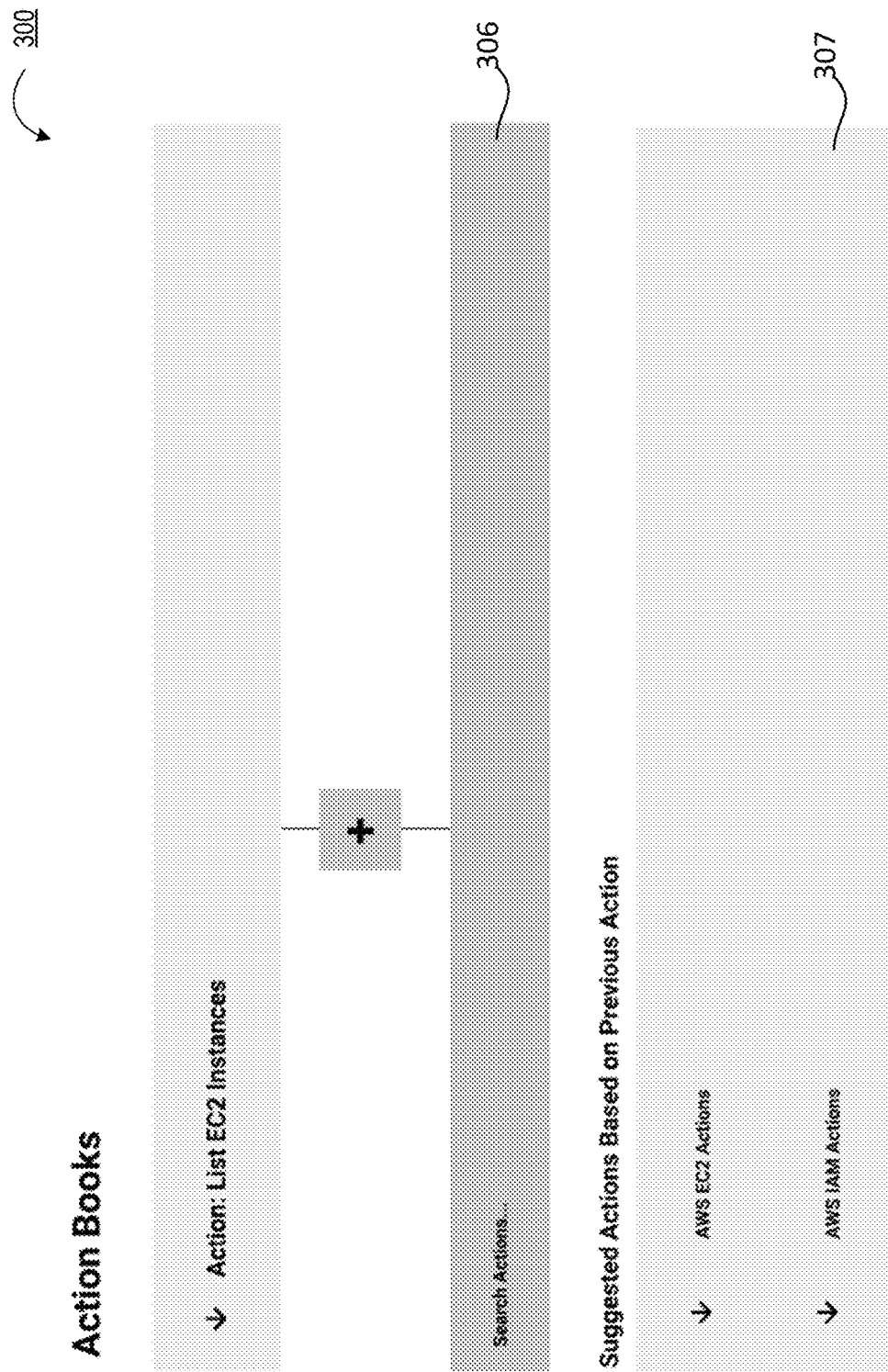

As shown in FIG. 3D, the user interface 300 can prompt the user (depicted by search actions 306) to select a second action component to receive as input the output results from the first action component. As shown, the user interface can additionally display suggested next actions 307 for the user. As described above, the integration manager can determine, based at least in part on the first action component, a suggested next action 307.

Figure 3E:
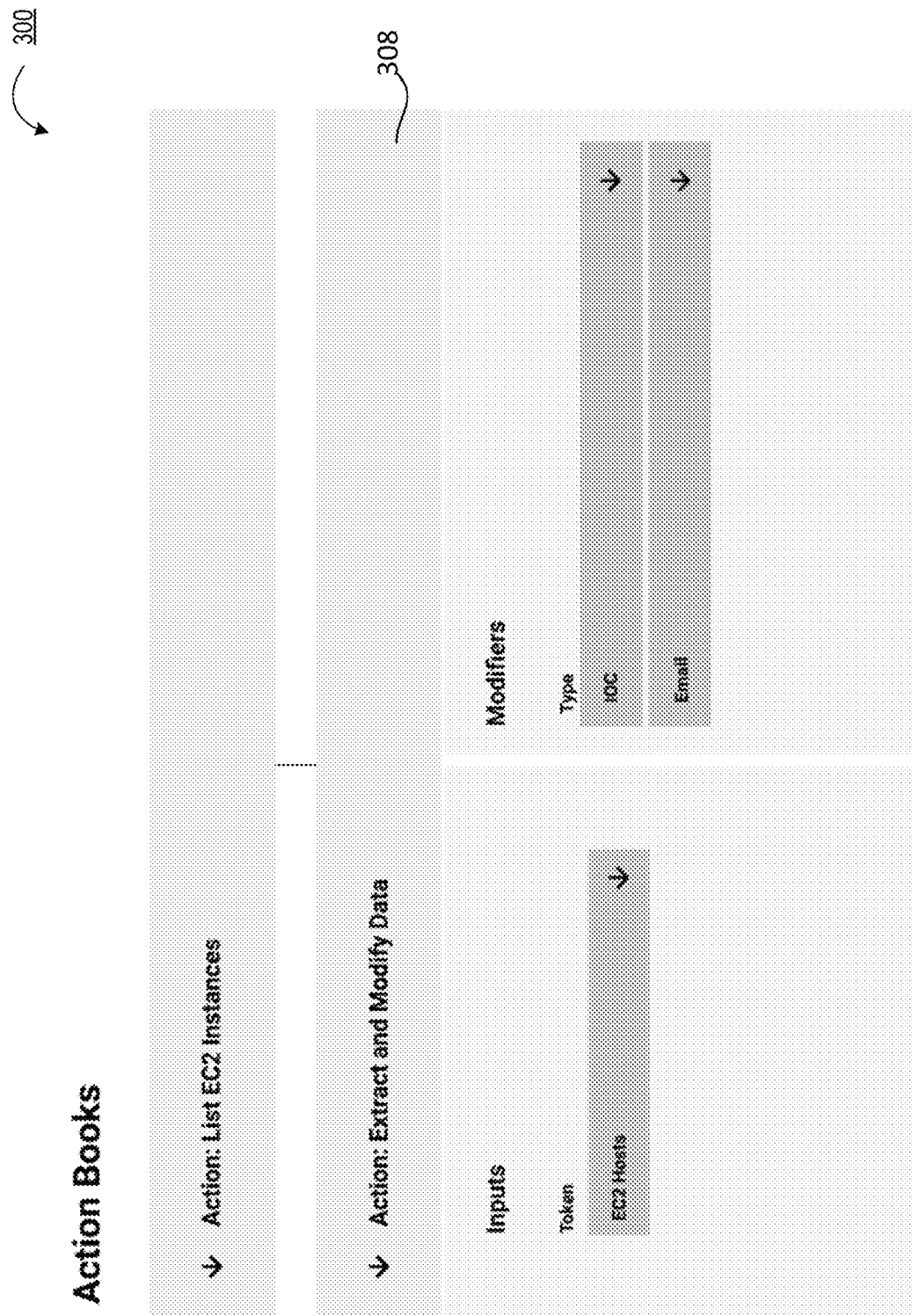

As shown in FIG. 3E, the user has selected an action component 308 that extracts and modifies the data produced by the first action component ("List EC2 Instances"). In this illustrative example, the action component 308 can analyze information associated with the the detected EC2 instances and identify email addresses associated with the owner or creator of those instances.

As shown in FIG. 3F, the user has executed the action component 308 against the output of the previous action component to generate a result set 309 that depicts email addresses associated with EC2 instances on the computer system.

Figure 3G:
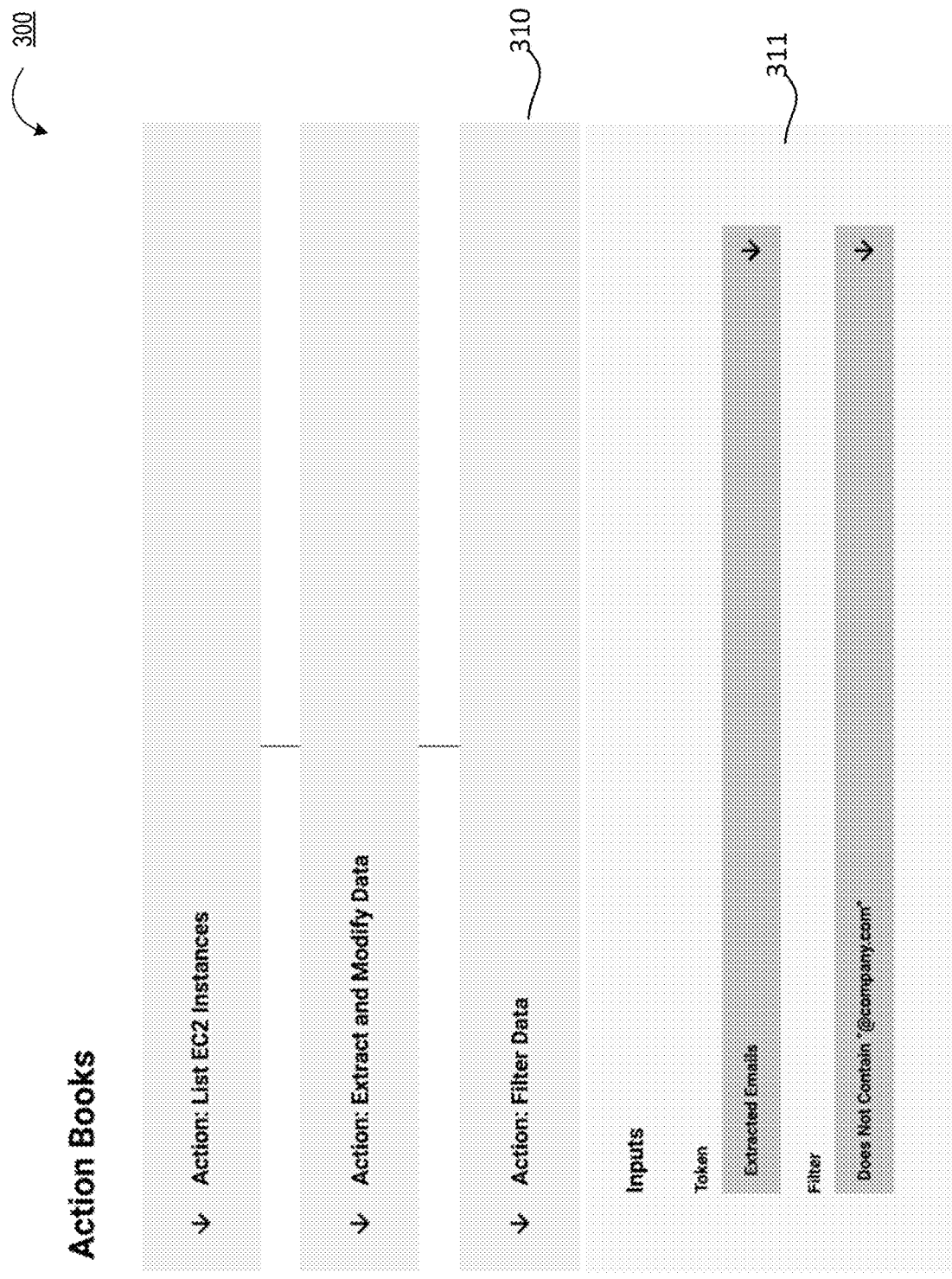

As shown in FIG. 3G, the user has selected another action component 310 that receives the result set 309 and performs a filter data operation. As shown, the user interface presents the inputs 311 of action component 310 as well as filter attributes. Thus, the action 311 can identify those email addresses that are not associated with the user's computer system. For example, the action 311 can identify those email addresses whose domain does not match an authorized domain for the computer system (e.g., "Does Not Contain "@company.com").

Figure 3H:
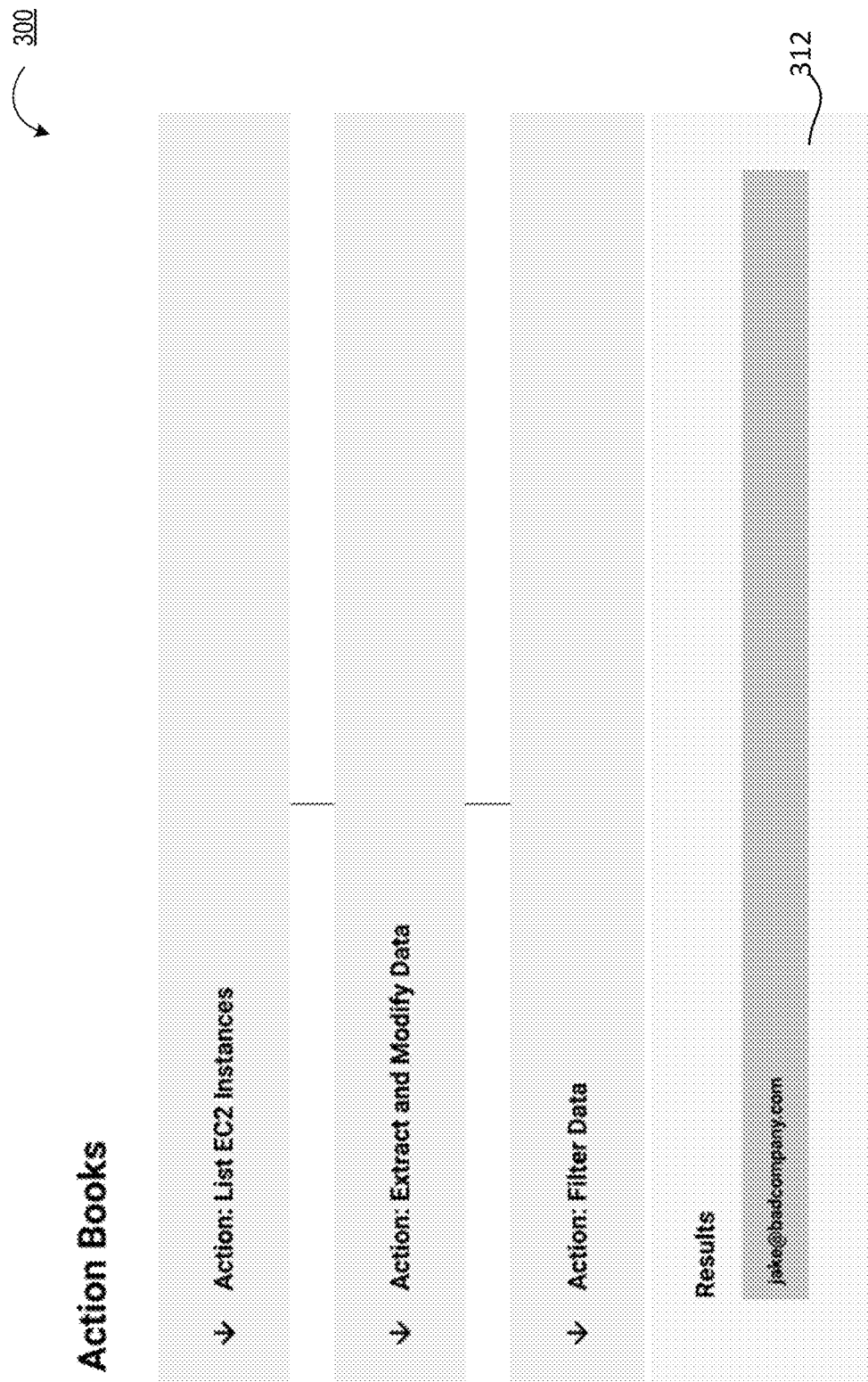

As shown in FIG. 3H, the user has executed action component 311 to produce output results 312, which includes an email address (jake@badcompany.com) that does not match the authorized domain specified by action 311.

Figure 3I:
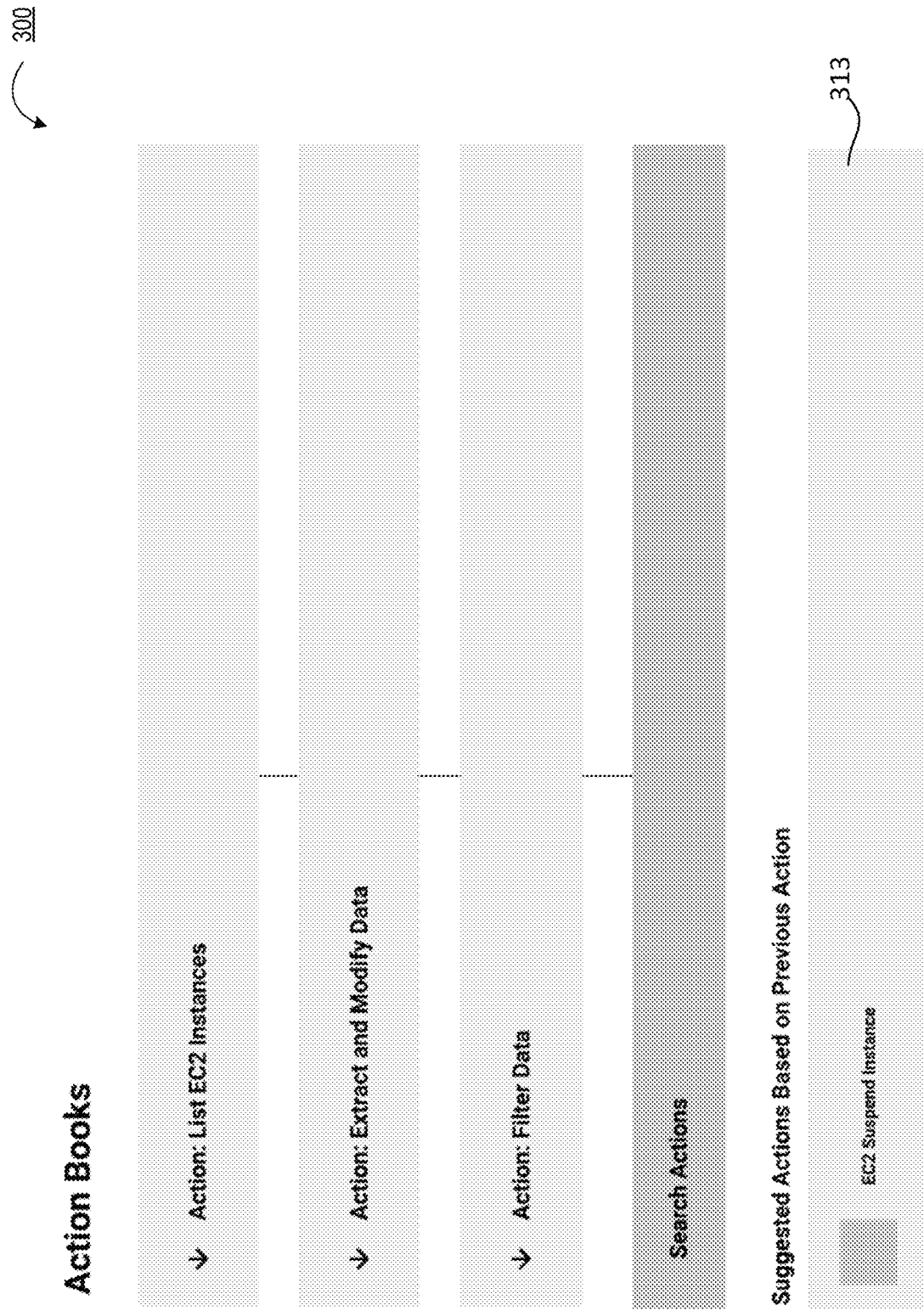

As shown in FIG. 3I, the user interface 300 displays a suggested action 313 based on the established flow of the previous action components. As noted above with respect to FIG. 2, the integration manager can generate this suggestion using a weighted graph of action components utilized by other workflows in the system. Here, the suggested action based on the previous action is "EC2 Suspend Instance".

Figure 3J:
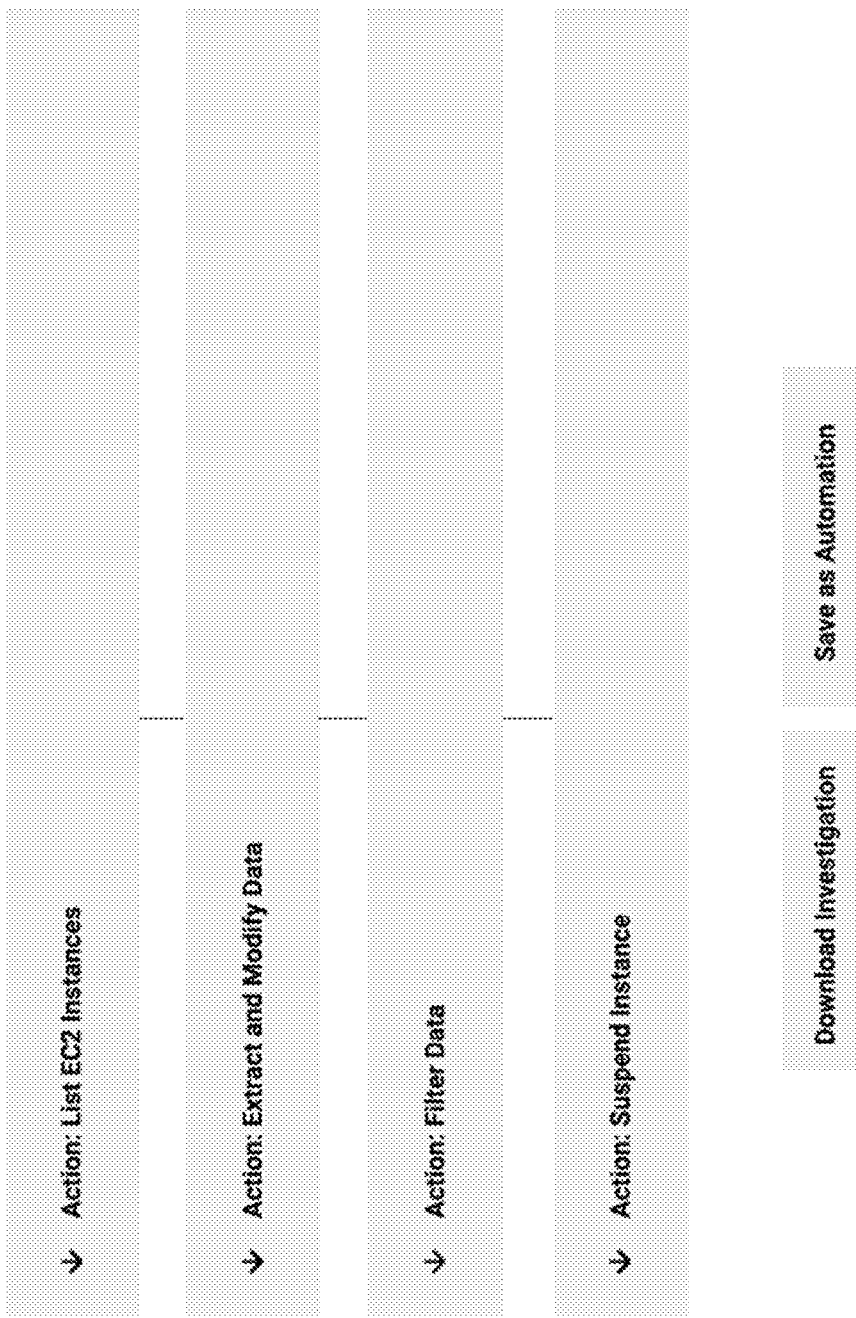

As shown in FIG. 3J, the action components selected by the user are depicted in the user interface as a new workflow. The user interface provides the user with the ability to save the workflow as an automation (e.g., save as automation 315) or download the workflow as an investigation document (e.g., download investigation 314), which preserves the results of the workflow as an investigation document to document the user's analysis of the rogue EC2 instances.

Figure 4:
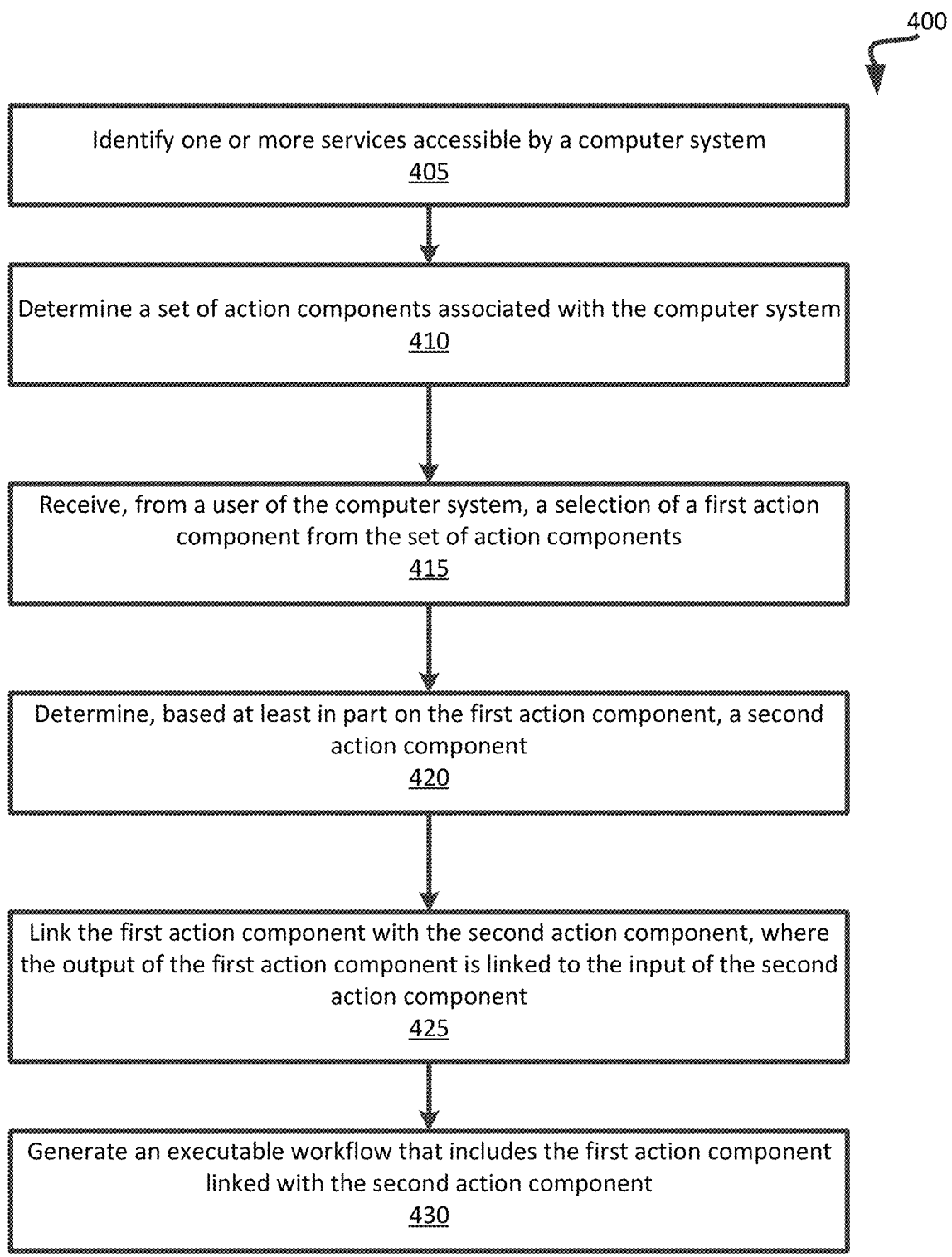
FIG. 4 depicts a flow diagram of a method for automating interactions with web services of a computing environment, in accordance with one or more aspects of the present disclosure.

FIG. 4 depicts a flow diagram of an example method 400 for automating interactions with web services of a computing environment. The method may be performed by processing logic that may comprise hardware (circuitry, dedicated logic, etc.), computer readable instructions (run on a general purpose computer system or a dedicated machine), or a combination of both. In an illustrative example, method 400 may be performed by integration manager 142 in FIG. 1. Alternatively, some or all of method 400 might be performed by another module or machine. It should be noted that blocks depicted in FIG. 4 could be performed simultaneously or in a different order than that depicted.

Figure 5:
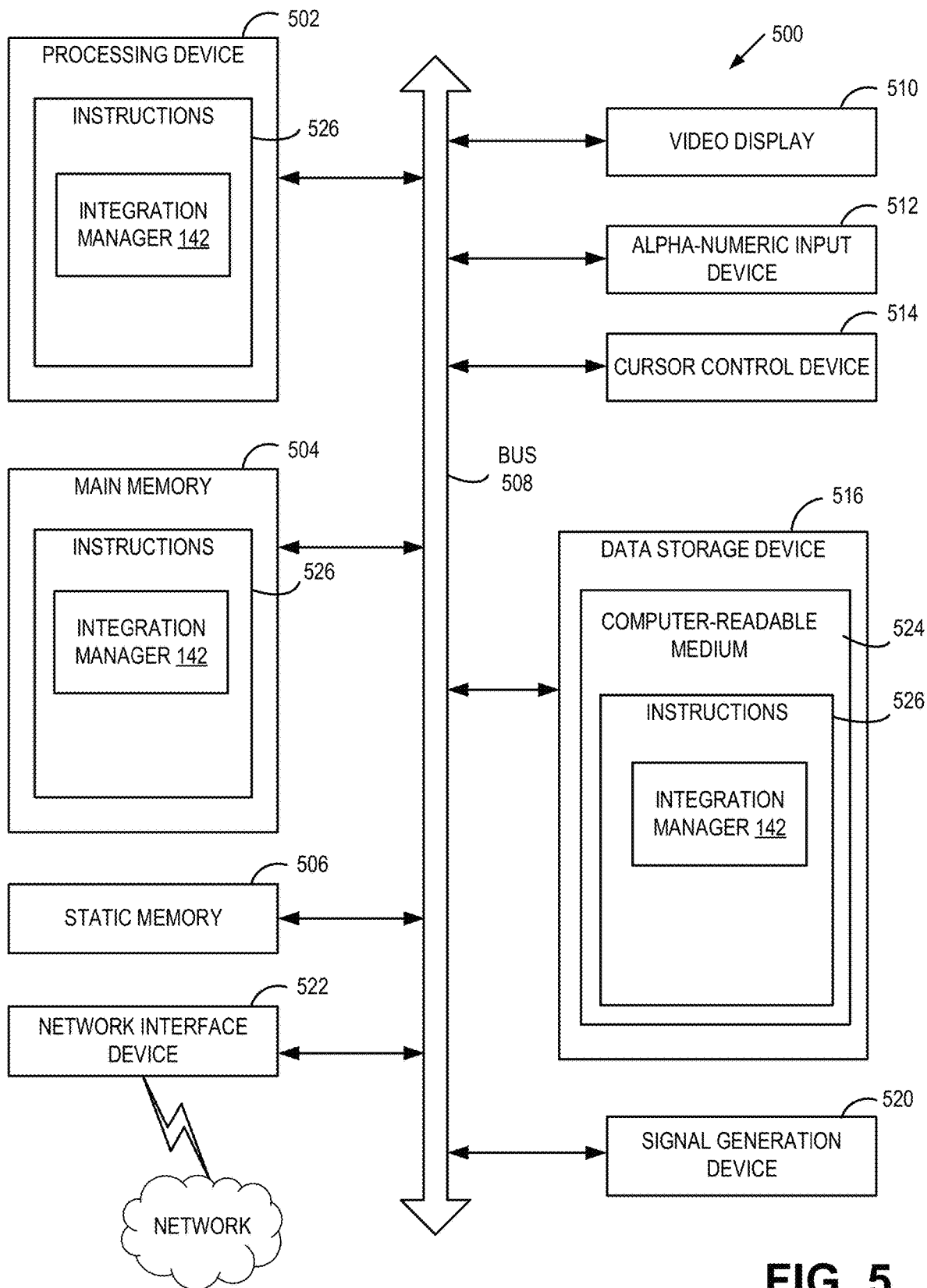
FIG. 5 depicts a block diagram of an illustrative computer system operating in accordance with one or more aspects of the present disclosure.

At block 405, processing logic identifies one or more services accessible by a computer system. At block 410, processing logic determines a set of action components associated with the computer system. In some implementations, each action component in the set of action components is configured to provide a functionality associated with at least one of the one or more services. At block 415, processing logic receives, from a user of the computer system, a selection of a first action component from the set of action components, where the first action component provides a first functionality, receives a first input, and provides a first output. At block 420, processing logic determines a second action component from the set of action components, where the second action component provides a second functionality, receives a second input, and provides a second output. At block 425, processing logic links the first action component with the second action component, where the first output of the first action component is linked to the second input of the second action component. At block 430, processing logic generates an executable workflow, where the executable workflow includes the first action component linked with the second action component FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic (e.g., instructions 526) that includes integration manager 142 for performing the operations and steps discussed herein (e.g., corresponding to the method of FIG. 4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a non-transitory computer-readable medium 524 on which may store instructions 526 that include integration manager 142 (e.g., corresponding to the method of FIG. 4, etc.) embodying any one or more of the methodologies or functions described herein. Integration manager 142 may also reside, completely or at least partially, within the main memory 504 and/or within the processing device 502 during execution thereof by the computer system 500, the main memory 504 and the processing device 502 also constituting computer-readable media. Integration manager 142 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "determining," "executing," "identifying," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:
identifying, by a processing device of a computer system, one or more services accessible by the computer system;
determining a set of action components associated with the computer system, wherein each action component of the set of action components is configured to provide a functionality associated with at least one of the one or more services;
receiving, from a user of the computer system, a selection of a first action component from the set of action components, wherein the first action component provides a first functionality, and wherein the first action component receives a first input and provides a first output;
identifying a weighted graph associated with the computer system, wherein the weighted graph comprises information indicative of action component sequences for additional workflows generated by other users of the computer system;
determining the one or more additional action components from the set of action components using the weighted graph;
receiving, from the user of the computer system, a selection of a second action component from the one or more additional action components, wherein the second action component provides a second functionality, and wherein the second action component receives a second input and provides a second output;
linking the first action component with the second action component, wherein the first output of the first action component is linked to the second input of the second action component; and
generating an executable workflow, the executable workflow comprising the first action component linked with the second action component.

2. The method of claim 1, further comprising:
updating the weighted graph with information associated with the executable workflow.

3. The method of claim 1, further comprising:
receiving, from the user, a final action component for the executable workflow, wherein the final action component is associated with a result dataset for the executable workflow;
determining, using the weighed graph, a sequence of target action components between the first action component and the final action component; and
generating the executable workflow using the sequence of target action components.

4. The method of claim 1, further comprising:
receiving a selection of an input dataset;
determining a data type associated with the input dataset;
determining, in view of the data type, one or more target action components configured to receive the input dataset as input; and
providing the one or more target action components to the user for selection.

5. The method of claim 1, further comprising:
receiving selection of an input dataset;

receiving, from the user, selection of a sample data from the input dataset;
executing, during a first test instance, the first action on the sample data; and
verifying results of the first test instance.

6. The method of claim 5, further comprising:
responsive to verification of results of the first test instance:
enabling selection of the second action;
receiving selection of a first output of the first action from the first test instance;
executing, during a second test instance, the second action on results of the first test instance; and
verifying results of the second test instance.

7. The method of claim 6, further comprising:
responsive to verification of results of the second test instance, executing the executable workflow on the input dataset.

8. A computer system comprising:
a memory; and
a processing device, operatively coupled to the memory, to:
identify one or more services accessible by the computer system;
determine a set of action components associated with the computer system, wherein each action component of the set of action components is configured to provide a functionality associated with at least one of the one or more services;
receive, from a user of the computer system, a selection of a first action component from the set of action components, wherein the first action component provides a first functionality, and wherein the first action component receives a first input and provides a first output;
identify a weighted graph associated with the computer system, wherein the weighted graph comprises information indicative of action component sequences for additional workflows generated by other users of the computer system;
determine the one or more additional action components from the set of action components using the weighted graph;
receiving, from the user of the computer system, a selection of a second action component from the one or more additional action components, wherein the second action component provides a second functionality, and wherein the second action component receives a second input and provides a second output;
link the first action component with the second action component, wherein the first output of the first action component is linked to the second input of the second action component; and
generate an executable workflow, the executable workflow comprising the first action component linked with the second action component.

9. The system of claim 8, wherein the processing device is further to:
update the weighted graph with information associated with the executable workflow.

10. The system of claim 8, wherein the processing device is further to:
receive, from the user, a final action component for the executable workflow, wherein the final action component is associated with a result dataset for the executable workflow;

determine, using the weighed graph, a sequence of target action components between the first action component and the final action component; and generate the executable workflow using the sequence of target action components.

11. The system of claim 8, wherein the processing device is further to:

receive a selection of an input dataset;

determine a data type associated with the input dataset;

determine, in view of the data type, one or more target action components configured to receive the input dataset as input; and provide the one or more target action components to the user for selection.

12. The system of claim 8, wherein the processing device is further to:

receive a selection of an input dataset;

receive, from the user, a selection of a sample data from the input dataset;

execute, during a first test instance, the first action on the sample data; and verify results of the first test instance.

13. The system of claim 12, wherein the processing device is further to:

responsive to verification of results of the first test instance:

enable selection of the second action;

receive selection of a first output of the first action from the first test instance;

execute, during a second test instance, the second action on results of the first test instance; and verify results of the second test instance.

14. The system of claim 13, wherein the processing device is further to:

responsive to verification of results of the second test instance, execute the executable workflow on the input dataset.

15. A non-transitory computer readable medium comprising instructions, which when accessed by a processing device, cause the processing device to:

identify one or more services accessible by the computer system;

determine a set of action components associated with the computer system, wherein each action component of the set of action components is configured to provide a functionality associated with at least one of the one or more services;

receive, from a user of the computer system, a selection of a first action component from the set of action components, wherein the first action component provides a first functionality, and wherein the first action component receives a first input and provides a first output;

identifying a weighted graph associated with the computer system, wherein the weighted graph comprises information indicative of action component sequences for additional workflows generated by other users of the computer system;

determining the one or more additional action components from the set of action components using the weighted graph;

receiving, from the user of the computer system, a selection of a second action component from the one or more additional action components the set of action components, wherein the second action component provides a second functionality, and wherein the second action component receives a second input and provides a second output;

link the first action component with the second action component, wherein the first output of the first action component is linked to the second input of the second action component; and generate an executable workflow, the executable workflow comprising the first action component linked with the second action component.

16. The non-transitory computer readable medium of claim 15, wherein the processing device is further to:

receive a selection of an input dataset;

receive, from the user, a selection of a sample data from the input dataset;

execute, during a first test instance, the first action on the sample data;

verify results of the first test instance;

responsive to verification of results of the first test instance:

enable selection of the second action;

receive selection of a first output of the first action from the first test instance;

execute, during a second test instance, the second action on results of the first test instance; and verify results of the second test instance; and responsive to verification of results of the second test instance, execute the executable workflow on the input dataset.

\* \* \* \* \*